(12) United States Patent
Yang et al.

(10) Patent No.: US 11,379,405 B2
(45) Date of Patent: Jul. 5, 2022

(54) INTERNET SMALL COMPUTER INTERFACE SYSTEMS EXTENSION FOR REMOTE DIRECT MEMORY ACCESS (RDMA) FOR DISTRIBUTED HYPER-CONVERGED STORAGE SYSTEMS

(71) Applicant: VMware, Inc., Palo Alto, CA (US)

(72) Inventors: Yang Yang, Shanghai (CN); Haitao Zhou, Shanghai (CN); Zhaohui Guo, Shanghai (CN); Jian Zhao, Shanghai (CN); Zhou Huang, Shanghai (CN); Jin Feng, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 357 days.

(21) Appl. No.: 16/656,499

(22) Filed: Oct. 17, 2019

(65) Prior Publication Data

US 2021/0081352 A1 Mar. 18, 2021

(30) Foreign Application Priority Data

Sep. 17, 2019 (WO) ................. PCT/CN2019/106151

(51) Int. Cl.
*G06F 15/173* (2006.01)
*G06F 13/16* (2006.01)
*H04L 49/901* (2022.01)
*H04L 67/1097* (2022.01)
*H04L 69/22* (2022.01)
*G06F 13/42* (2006.01)

(52) U.S. Cl.
CPC .... *G06F 15/17331* (2013.01); *G06F 13/1668* (2013.01); *G06F 13/4221* (2013.01); *H04L 49/901* (2013.01); *H04L 67/1097* (2013.01); *H04L 69/22* (2013.01)

(58) Field of Classification Search
CPC .......... G06F 15/17331; G06F 13/1668; G06F 13/4221; H04L 49/901; H04L 67/1097; H04L 69/22
See application file for complete search history.

(56) References Cited

U.S. PATENT DOCUMENTS

2006/0013251 A1* 1/2006 Hufferd ............... H04L 67/1097
370/466
2016/0085718 A1* 3/2016 Huang .................. H04L 29/08
709/213
2017/0324704 A1* 11/2017 Wood ...................... H04L 63/10

\* cited by examiner

*Primary Examiner* — Samina F Choudhry
(74) *Attorney, Agent, or Firm* — Patterson + Sheridan, LLP (57) ABSTRACT

Certain Embodiments described herein relate to configuring the network-storage stack of two devices (e.g., physical or virtual) communicating together (e.g., an initiator and a target, as defined below) with Internet Small Computer Systems Interface (iSCSI) extension for remote direct memory access (RDMA) iSER, which is a protocol designed to utilize RDMA to accelerate iSCSI data transfer. The iSER protocol is implemented as an iSER datamover layer that acts as an interface between an iSCSI layer and an RDMA layer of the network-storage stacks of the two devices. Using iSER in conjunction with RDMA allows for bypassing the existing traditional network protocol layers (e.g., TCP/IP protocol layers) of the devices and permits data to be transferred directly, between the two devices, using certain memory buffers, thereby avoiding memory copies taking place when the existing network protocol layers are used.

13 Claims, 8 Drawing Sheets

INTERNET SMALL COMPUTER INTERFACE SYSTEMS EXTENSION FOR REMOTE DIRECT MEMORY ACCESS (RDMA) FOR DISTRIBUTED HYPER-CONVERGED STORAGE SYSTEMS

CROSS-REFERENCE TO RELATED APPLICATIONS

This application claims priority to International Application No. PCT/CN2019/106151, filed Sep. 17, 2019. The content of the application is hereby incorporated by reference in its entirety.

BACKGROUND

Distributed systems allow multiple clients in a network to access a pool of shared resources. For example, a distributed storage system allows a cluster of host computers or other computing systems ("nodes") to aggregate local storage devices (e.g., SSD, PCI-based flash storage, SATA, or SAS magnetic disks) located in or attached to each node to create a single and shared pool of storage. This pool of storage (sometimes referred to herein as a "datastore" or "store") is accessible by all nodes in the cluster and may be presented as a single namespace of storage entities (such as a hierarchical file system namespace in the case of files, a flat namespace of unique identifiers in the case of objects, etc.). Storage clients in turn, such as virtual computing instances (VCIs) (e.g., virtual machines (VMs), containers, etc.) spawned on host computers or physical machines may use the datastore to store data. In one example, virtual machines may use the datastore to store virtual disks that are accessed by the virtual machines during their operation. The virtual disks may be stored in the datastore in the form of objects, which may also be referred to as virtual disk objects. Nodes in the cluster may access virtual disk objects stored in other nodes in the cluster using a protocol referred to as Small Computer Systems Interface (SCSI), which comprises a set of interfaces that allow nodes in the cluster to access storage resource of other nodes in the cluster.

In some cases, to make the data, such as virtual disk objects, available to computing systems (e.g., physical or virtual) outside of the cluster of nodes, each node in the cluster may further be configured with the Internet Small Computer Systems Interface (iSCSI). iSCSI, is an Internet Protocol (IP)-based storage networking standard for linking the nodes in the cluster to the nodes or workloads outside of the distributed storage system. Generally, iSCSI is implemented as a protocol layer to interact with the Transmission Control Protocol (TCP) protocol layer in a network stack of a node within the cluster, thereby, enabling the node to exchange SCSI commands with a node outside the cluster over a network, such as a layer-3 network. However, using the TCP protocol layer may result in low input/output (I/O) performance and high central processing unit (CPU) utilization.

DETAILED DESCRIPTION

Embodiments described herein relate to configuring the network-storage stack of two devices (e.g., physical or virtual) communicating together (e.g., an initiator and a target, as defined below) with iSER, which is a protocol designed to utilize RDMA to accelerate iSCSI data transfer. The iSER protocol is implemented as an iSER datamover layer that acts as an interface between an iSCSI layer and an RDMA layer of the network-storage stacks of the two devices. Using iSER in conjunction with RDMA allows for bypassing the existing traditional network protocol layers (e.g., TCP/IP protocol layers) of the devices and permits data to be transferred directly, between the two devices, using certain memory buffers, thereby avoiding memory copies taking place when the existing network protocol layers are used.

Figure 1:
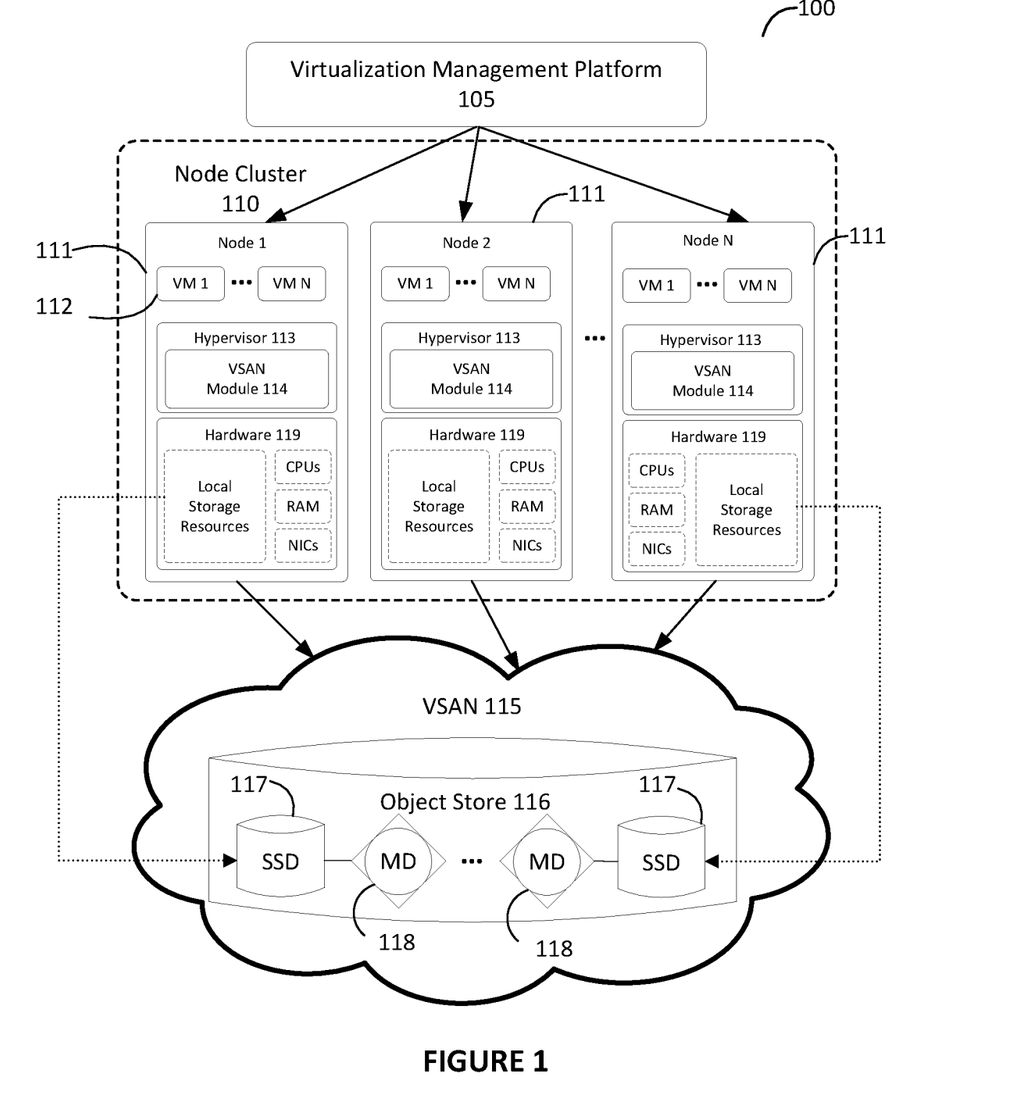
FIG. 1 illustrates an example computing environment in which one or more embodiments may be implemented, according to certain embodiments.

FIG. 1 illustrates an example computing environment in which one or more embodiments may be implemented. As shown, computing environment 100 is a software-based "virtual storage area network" (VSAN) environment that leverages the commodity local storage housed in or directly attached (hereinafter, use of the term "housed" or "housed in" may be used to encompass both housed in or otherwise directly attached) to host servers, or nodes 111 of a cluster 110, to provide an aggregate object store 116 to virtual machines (VMs) 112 running on nodes 111. The local commodity storage housed in or otherwise directly attached to each node 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

In addition, as further discussed below, each node 111 may include a storage management module (referred to herein as a "VSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending on its intended use (e.g., capacity, availability, IOPS, etc.), the administrator may define a storage profile or policy for each VM specifying such availability, capacity, IOPS and the like. As further described below, the VSAN module may then create an "object" for the specified virtual disk by backing it with the datastore of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes conventional computing hardware, such as one or more central processing units, random access memory, read-only memory, one or more network interface controllers, SSDs 117, and magnetic disks 118). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 for use as storage for virtual disks (or portions thereof) and other related files that may be accessed by any VM 112 residing in any of nodes 111 in cluster 110.

In one embodiment, VSAN module 114 is implemented as a "VSAN" device driver within hypervisor 113. VSAN module 114 provides access to a conceptual VSAN 115 through which an administrator can create a number of top-level "device" or namespace objects that are backed by object store 116. In one common scenario, during creation of a device object, the administrator specifies a particular file system for the device object (such device objects hereinafter also thus referred to "file system objects"). For example, each hypervisor 113 in each node 111 may, during a boot process, discover a /vsan/ root node for a conceptual global namespace that is exposed by VSAN module 114. By accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through VSAN 115 may, for example, be implemented to emulate the semantics of a particular file system such as a virtual machine file system, VMFS, which is designed to provide concurrency control among simultaneously accessing VMs. Because VSAN 115 supports multiple file system objects, it is able to provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

A file system object, may, itself, provide access to a number of virtual disk descriptor files accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPs, etc.) of a corresponding storage profile or policy generated by the administrator when initially creating the virtual disk. Each VSAN module 114 (through a cluster level object management or "CLOM" sub-module) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in some embodiments as further described below) traverses a hierarchy of objects using the metadata in the in-memory database in order to properly route an I/O operation request to the node that houses the actual physical local storage that backs the portion of the virtual disk that is subject to the I/O operation.

Figure 2:
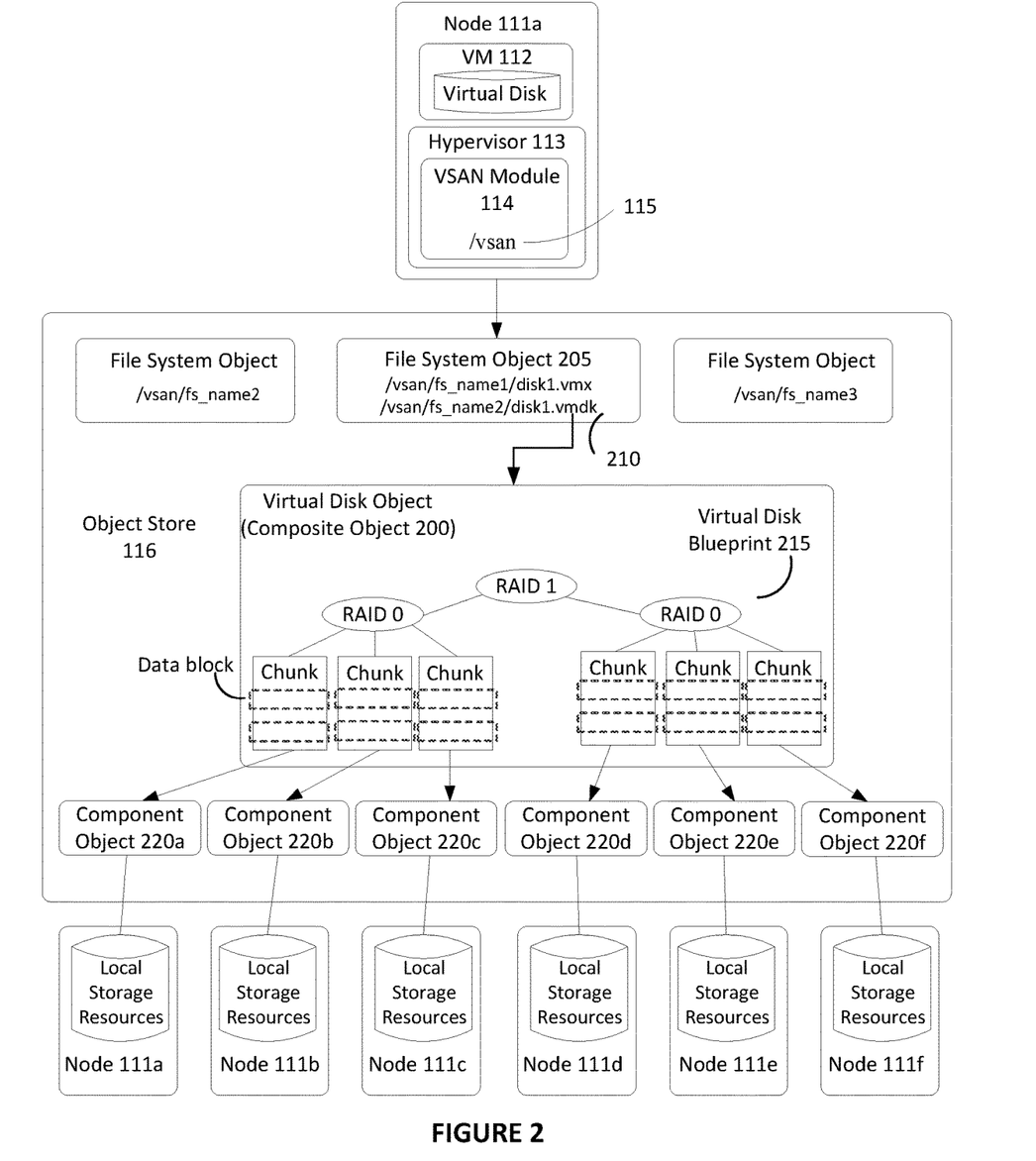
FIG. 2 illustrates an example hierarchical structure of objects organized within an object store that represent a virtual disk, according to certain embodiments.

FIG. 2 illustrates an example hierarchical structure of objects organized within object store 116 that represent a virtual disk. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed). For example, VSAN module 114, by querying its local copy of the in-memory metadata database, is able to identify a particular file system object 205 (e.g., a VMFS file system object) stored in VSAN 115 that stores a descriptor file 210 for the virtual disk. It should be recognized that the file system object 205 may store a variety of other files consistent with its purpose, such as virtual machine configuration files and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped and partitioned in a RAID 0 configuration. Composite object 200 may thus contain references to a number of "leaf" or "component" objects $220_x$ corresponding to each data chunk (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_x$ in cluster 110 that houses the physical storage resources (e.g., SDD 117, magnetic disks 118, etc.) that actually stores the data chunk (as well as the location of the data chunk within such physical resource). The RAID 1/RAID 0 combination is merely an example of how data associated with a composite object 200 may be stored by nodes 111 (e.g., nodes 111a-111f) of node cluster 110. In other examples, all data associated with composite object 200 may be stored in one node (e.g., node 111a). In yet another example, data associated with composite object 200 may be only mirrored by a RAID 1 operation such that one copy of the data may be stored in one node and another copy may be stored by another node. In other examples, other RAID operations or a combination of a variety of RAID operations (e.g., RAID1/RAID 5) may be used when distributing data associated with composite object 200. Regardless of how data associated with a VM 112's virtual disk is partitioned or copied across nodes, however, the data is still stored as a plurality of data blocks.

Figure 3:
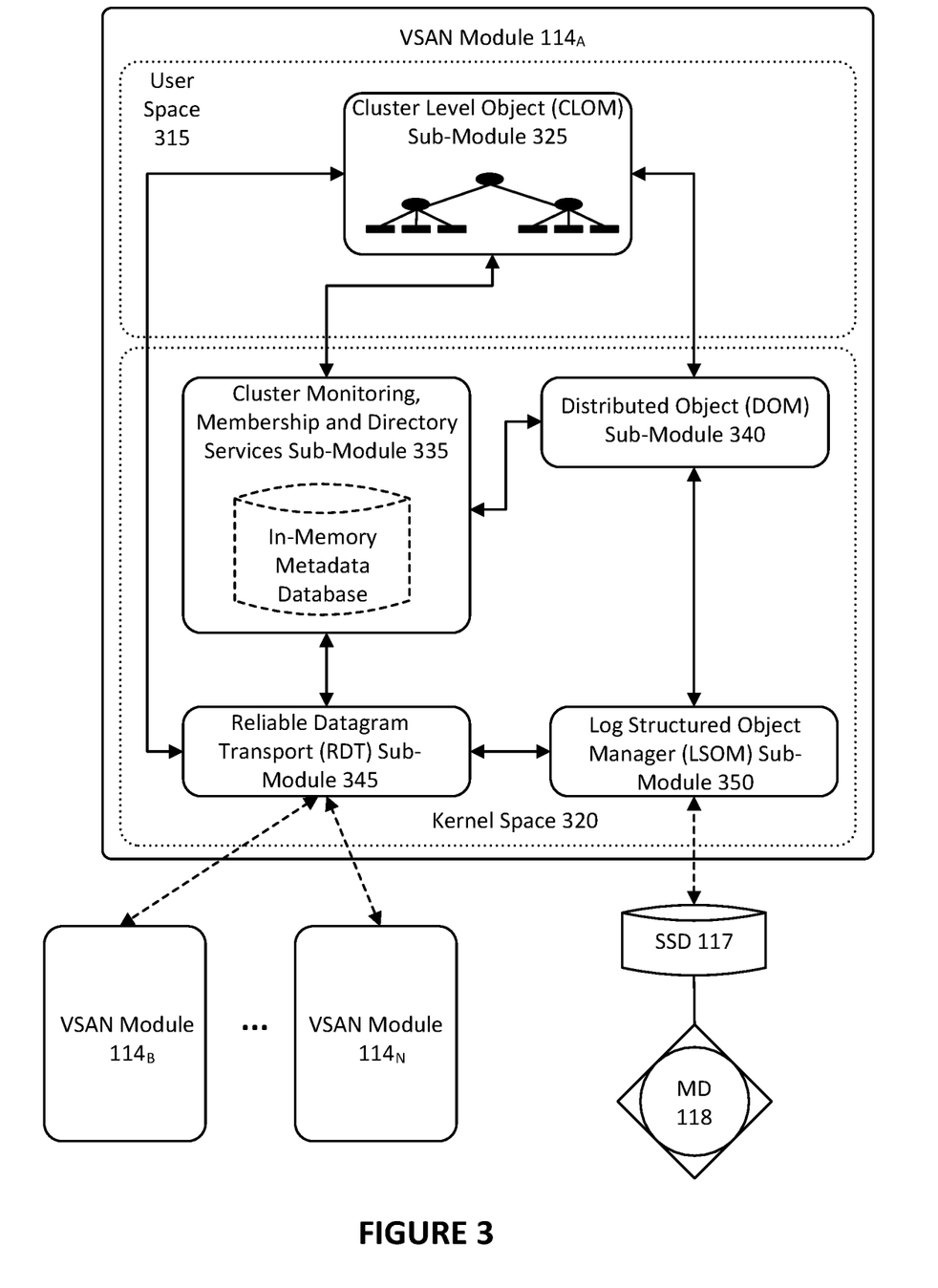
FIG. 3 illustrates components of a virtual storage area network module implemented in the computing environment of FIG. 1, according to certain embodiments.

FIG. 3 illustrates components of VSAN module 114. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In some embodiments, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.). For example, CLOM sub-module 325, in some embodiments, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ratio, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., stripes) of the composite object, and more particularly, data blocks of component objects, to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and their corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, during the handling of I/O operations as well as during object creation, DOM sub-module 340 controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node that serves as the coordinator for the particular component object (e.g., data chunk, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of node 111 running the VM would also have to communicate across the network with the DOM sub-module 340 of the coordinator. In certain embodiments, if the VM issuing the I/O operation resides on a node that is different from the coordinator of the virtual disk object subject to the I/O operation, the two DOM sub-modules 340 of the two nodes may need to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which node 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In some embodiments, the underlying transport is TCP. Alternatively, other transports such as remote direct memory access (RDMA) may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

As described above, objects in objects store 116 may be made available to computing systems outside node cluster 110. For example, one or more computing systems may communicate with node cluster 110, for data storage and retrieval, through a network. A computing system, accessing node cluster 110 for data storage and retrieval, may be referred to as an initiator. Node cluster 110 may be referred to as "storage," and a node 111 within node cluster 110 that is accessed by the initiator may be referred to as a target. In certain aspects, both the initiator and the target are configured with a network-storage protocol stack that allows the initiator and the target to exchange data over an IP network. A network-storage protocol stack, as further illustrated in FIG. 4, comprises different network and storage protocol layers (e.g., SCSI layer, iSCSI layer, TCP layer) that facilitate the exchange of information between the initiator and the target. In certain embodiments, the network-storage protocol stack is implemented in the kernel space of the initiator's or target's hypervisor. For example, hypervisor 113 of a target node 111 of node cluster 110 may be configured with a network-storage protocol stack to receive and process read and write requests from an initiator.

To illustrate this, in one example, a workload executing on the initiator may need access to a file or certain data stored in node cluster 110. In such an example, the initiator generates a read request, which is converted to a SCSI command by the SCSI layer. The SCSI command is then converted to an iSCSI command by an iSCSI layer. The iSCSI command is next encapsulated by a TCP/IP layer, resulting in an iSCSI command with TCP/IP headers. For example, in the TCP/IP headers, the TCP/IP layer adds the IP address of the initiator as the source IP address and the destination IP address of the target as the destination IP address. A user configures a target to be available to the initiator and also configures the initiator to communicate with the target when requesting access to information from node cluster 110. The iSCSI command, comprising the read request, is then processed by a network interface card (NIC) driver of a NIC associated with the initiator. Subsequently, the iSCSI command is transmitted by the NIC over the network to a NIC of the target in node cluster 110. An iSCSI command that is encapsulated, such as described above, and transmitted over the network may be referred to as an iSCSI Protocol Data Unit (PDU).

Figure 4:
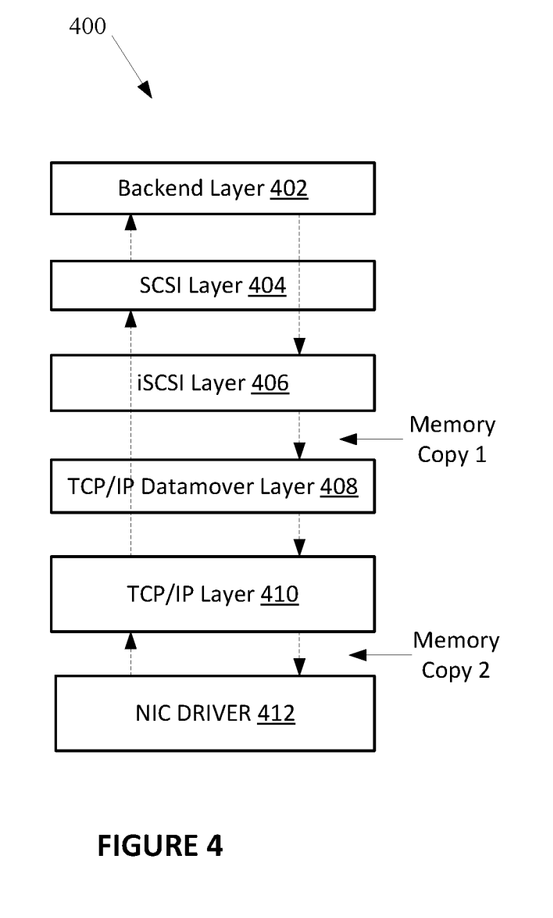
FIG. 4 illustrates an example network-storage protocol stack, according to certain embodiments.

The iSCSI PDU is then received at a target within node cluster 110 that is configured with the same network-storage protocol stack as the initiator. FIG. 4 illustrates an example network-storage protocol stack 400 at the target. Network-storage protocol stack 400 comprises a backend layer 402, a SCSI layer 404, an iSCSI layer 406, a TCP/IP datamover layer 408, a TCP/IP layer 410, and a NIC driver 412. Backend layer 402 may refer to a set of software instructions that allow SCSI layer 404 to interface with node cluster 110 in order to retrieve or store information from and in the object store that is provided by node cluster 110. SCSI layer 404 builds/receives SCSI CDBs (Command Descriptor Blocks) and relays/receives them with the remaining command execute parameters to/from iSCSI Layer 406. iSCSI layer 406 builds/receives iSCSI PDUs and relays/receives them to/from one or more TCP connections that form an initiator-target "session." TCP datamover layer 408 provides a set of transport primitives or operations (e.g., connection lifecycle management and PDU transport primitives) that allow the target to manage a connection and communicate with the initiator. TCP/IP layer 410 is configured to decapsulate iSCSI PDUs (e.g., remove TCP/IP headers) or encapsulate SCSI PDUs (e.g., append TCP/IP headers) using TCP/IP instructions.

When the iSCSI PDU, transmitted by the initiator, arrives at the target's NIC, it is processed by NIC driver 412, which comprises a software program for controlling the target's NIC. Subsequently, TCP/IP layer 410 de-capsulates the iSCSI PDU packet by removing the TCP and IP headers, thereby extracting the iSCSI command. The iSCSI command is then stored in a memory location in the target's memory resources (e.g., RAM in hardware 119). This memory location is accessible by some of the upper layers, including the TCP/IP datamover layer 408, the iSCSI layer 406, and the SCSI layer 404. As such, each of those upper layers is able to further process and/or de-capsulate the iSCSI command by accessing the iSCSI command at the same memory location. For example, iSCSI layer 406 is able to access the iSCSI command at the memory location and retrieve the SCSI command.

When SCSI layer 404 accesses the SCSI command, it allocates a scatter gather list ("sglist") for the retrieval of the information that is requested by the read request associated with the SCSI command. The sglist is a data structure allocated in memory, with a certain starting memory address and an ending memory address. Backend layer 402 then passes the read request to the node cluster 110 (e.g., VSAN module 114 of the target), which processes the read request by retrieving the requested information from object store 116 and then stores the information in the sglist. Once the information is stored in the sglist, backend layer 402 then passes the ownership of the sglist to SCSI layer 404, converts the information to a SCSI DATA-IN PDU. iSCSI layer 406 then accesses the SCSI DATA-IN PDU in the sglist and converts the SCSI DATA-IN PDU into a iSCSI command. iSCSI layer 406 then allocates another data structure, referred to as an "mbuffer" or "mbuf," with a starting and an ending memory address and copies the information in the sglist to the mbuf. This is because TCP/IP datamover layer 408 only recognizes the mbuf data structure. TCP/IP datamover layer 408 then provides the memory address of the mbuf to the TCP/IP layer 410, which is configured to encapsulate the iSCSI command in the mbuf to create an iSCSI PDU. Once an iSCSI PDU is generated, TCP/IP layer 410 may copy the iSCSI PDU from the mbuf to buffers of NIC driver 412. Buffers of NIC driver 412 act as queues where outgoing PDUs are stored before being transmitted over the network.

Because of the two memory copies discussed above, using the TCP-based protocol layers (TCP/IP datamover layer 408 and TCP/IP layer 410) may result in latency as well as an inefficient use of compute resources. Latency is increased due to a network bottleneck associated with having to perform memory copies for each one of a large number of read/write requests to the target. In addition, additional compute cycles have to be utilized for performing such memory copies.

Although FIG. 4 shows memory copies associated with a read command received from an initiator, a memory copy also occurs with respect to a write command received from the initiator. For example, initiator may generate a write command, convert it to a SCSI command, convert the SCSI command to an iSCSI command, encapsulate the iSCSI command with TCP/IP headers, and transmit the iSCSI command with TCP/IP headers to the target. When the iSCSI command with TCP/IP headers is received by the target, the target allocates an mbuf for storing the data that will be received from the initiator later on. The target then sends an R2T (ready to transfer) PDU back to the initiator, indicating that the target is prepared for accepting any incoming DAT-OUT PDUs, that refer to PDUs comprising the data that the initiator intends to send to the target. Once the initiator receives the R2T PDU, it transmits DATA-OUT PDUs to the target. Once the target receives a DATA-OUT PDU, TCP/IP datamover layer 408 stores the data therein in the mbuf. The ownership of the mbuf is then passed through the upper layers, until it reaches the backend layer 402. However, because VSAN module 114 of the target does not accept or recognize the mbuf, a memory copy has to be performed to move the data included in the mbuf to a data structure (e.g., sglist) that is recognized by node cluster 110.

Accordingly certain embodiments described herein relate to using the iSCSI Extension for Remote Direct Memory Access (RDMA) (iSER), which is a protocol designed to utilize RDMA to accelerate iSCSI data transfer. The iSER protocol is implemented as an iSER datamover layer that acts as an interface between the iSCSI layer and an RDMA layer. In other words, iSER provides the RDMA data transfer capability to the iSCSI layer by layering iSCSI on top of an RDMA-Capable Protocol. Using iSER in conjunction with RDMA allows for bypassing the TCP/IP protocol layers and permits data to be transferred directly, between an initiator and a target, using certain memory buffers, thereby avoiding the memory copies described above.

RDMA enables low latency transfer of information between the initiator and the target at the memory-to-memory level, without burdening the CPUs at either the initiator or the target. This transfer function is offloaded to the RDMA-enabled NIC (also referred to as "RNIC") in order to bypass the operating system's network stack (e.g., TCP/IP protocol layer). With RDMA, RNICs can work directly with the memory of applications, allowing data transfers over the network without the need to involve the CPU, thereby providing a more efficient and faster way to move data between the initiator and the target at lower latency and CPU utilization.

Figure 5:
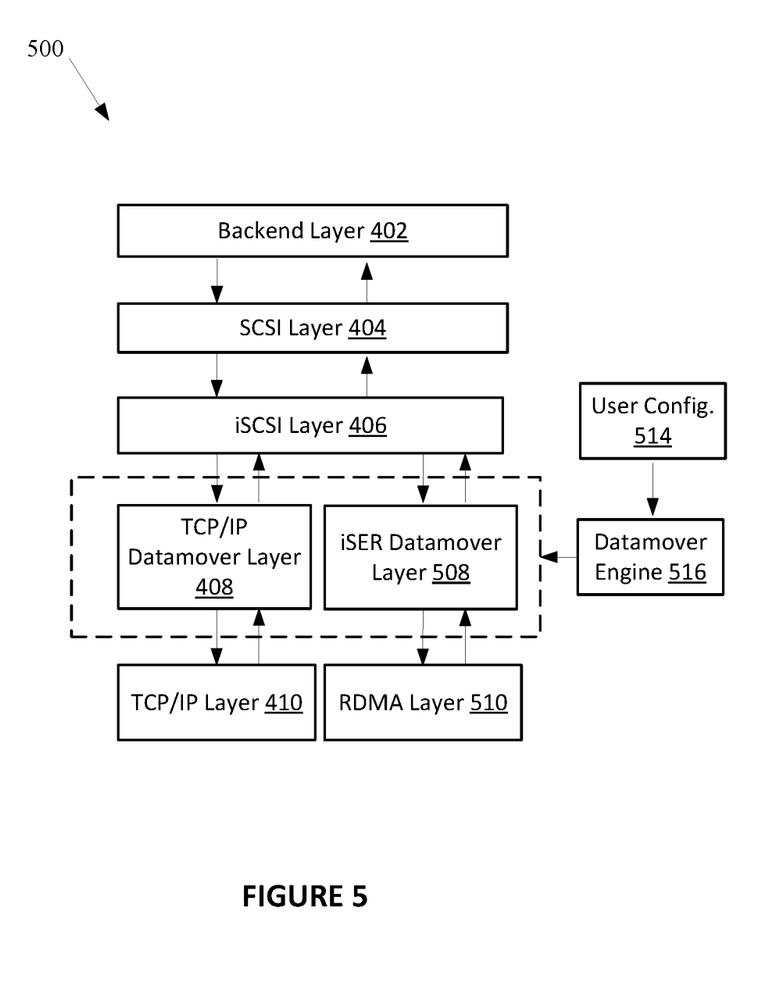
FIG. 5 illustrates an example network-storage protocol stack with an iSCSI extension for RDMA (iSER), according to certain embodiments.

FIG. 5 illustrates an example network-storage protocol stack 500 at the target. Network-storage protocol stack 500 includes backend layer 402, SCSI layer 404, iSCSI layer 406, TCP/IP datamover layer 408, iSER datamover layer 508, TCP/IP layer 410, and RDMA layer 510. iSER datamover layer 508 functions similar to TCP/IP datamover layer 408 and provides the same transport primitives. iSER datamover layer 508 implements the iSER protocol by providing connection lifecycle management and PDU transport primitives to iSCSI layer 404, thereby allowing the transfer of iSCSI PDUs through the use of RDMA layer 510.

In the example of FIG. 5, because network-storage protocol stack 500 is configured with both TCP/IP datamover layer 408 and iSER datamover layer 508, the target may utilize any one of the two protocols for data communication. For example, a user may configure the target such that the iSCSI layer 406 may utilize the TCP/IP datamover layer 408 to access the TCP/IP layer 410 when the target is configured with a standard NIC (e.g., a non-RDMA-enabled NIC) or, instead, utilize the iSER datamover layer 508 to access the RDMA layer 510 when the target is configured with an RNIC. In the example of FIG. 5, the user configures the target with user configuration 514, which is consumed by datamover engine 516. Datamover engine 516 refers to a set of instructions that are used to initialize a datamover layer and establish a link between the initialized datamover layer and iSCSI layer 406.

Figure 6:
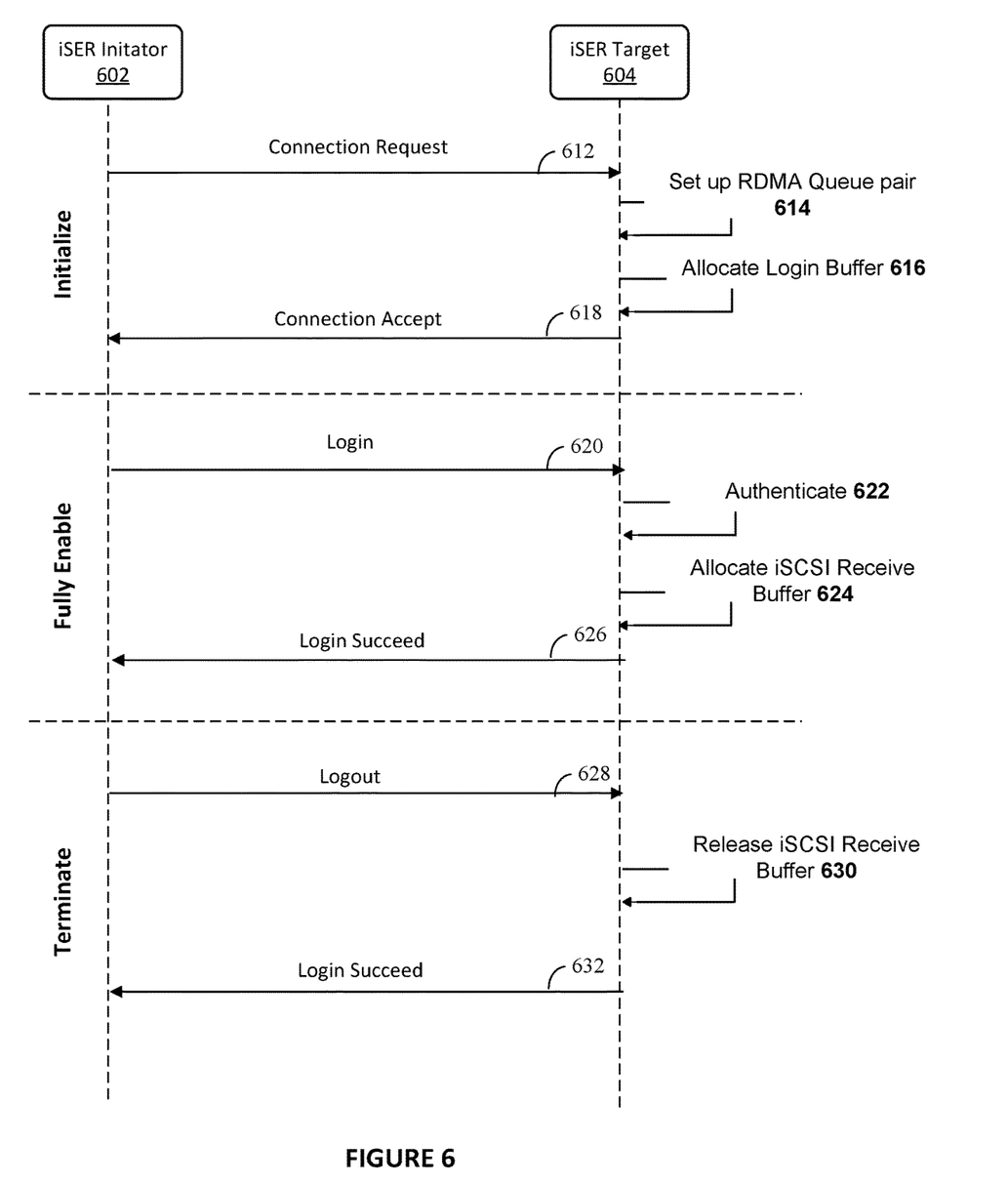
FIG. 6 illustrates an example connection lifecycle management procedure between an iSER target and an iSER initiator, according to certain embodiments.

FIG. 6 illustrates an example flow diagram of how connection lifecycle may be managed between an iSER target 604 and an iSER initiator 602 that are both configured with a network-storage protocol stack having an iSER datamover layer 508 and RDMA layer 510. An example of such a network-storage protocol stack was shown in FIG. 5. An iSER target refers to a target that has been configured with the iSER protocol (e.g., includes the iSER datamover layer in its network-storage stack). An iSER initiator refers to an initiator that has been configured with the iSER protocol (e.g., includes the iSER datamover layer in its network-storage stack).

At step 612, iSER initiator 602 transmits a connection request to iSER target 604.

At step 614, upon receiving the connection request, iSER target 604 sets up an RDMA queue pair for incoming transport requests. Setting up the RDMA queue pair includes allocating a memory region in the memory of the iSER target, with a starting and an ending address, for operations associated with the RDMA communication between iSER initiator 602 and iSER target 604. The RDMA communication is based on a set of three queues including a send queue, a receive queue, and a completion queue, which are all instantiated in the allocated memory region. The send and receive queues are responsible for scheduling work and are created in pairs, also referred to as the queue pair and may be referred to as work queues. Work queues are allocated in the allocated memory region and hold instructions as to what data (e.g., messages) stored in buffers (e.g., buffers allocated in memory storing outgoing/incoming messages) are to be sent or received. Such instructions are small structs (e.g., composite data types) and are called work requests or work queue elements (WQE). A WQE includes a pointer to a buffer. For example, a WQE placed on the send queue contains a pointer to a buffer address storing a message to be sent. In another example, a pointer in the WQE on the receive queue contains a pointer to a buffer address for a location in the buffer where an incoming message from the network can be placed. The completion queue is configured to generate a notification when the instructions placed in the work queues have been completed.

At step 616, iSER target 604 allocates a login buffer. A login buffer may also be allocated in the memory region and is configured to store information (e.g., credentials) received from iSER initiator 602 for logging in.

At step 618, iSER target 604 accepts the connection request transmitted by iSER initiator 602.

At step 620, iSER initiator 602 logs in. For example, iSER initiator 602 transmits information to iSER target 604, which is stored in the login buffer.

At step 622, iSER target 604 then accesses the information to authenticate and negotiate with iSER initiator 602. In one example, the negotiation includes determining the maximum number of outstanding iSCSI control-type PDUs that iSER target 604 may hold. Note that iSCSI PDUs that cause the SCSI data to be moved between iSER initiator 602 and iSER target 604 may be referred to as "iSCSI data-type PDUs." All other possible iSCSI PDUs may be referred to as "iSCSI control-type PDUs."

At step 624, iSER target 604 allocates multiple memory chunks to store the incoming outstanding iSCSI PDUs. For example, iSER target 604 allocates iSCSI control-type PDU receive buffers.

At step 626, iSER target 604 transmits an indication to iSER initiator 602 that indicates to iSER initiator 602 that the login has been successful. Steps 620 through 626 are performed as part of a phase that is referred to as the login phase. Upon the completion of this phase, iSER target 604 is able to fully perform iSCSI functions such as read and write operations.

At step 628, iSER initiator 602 requests a logout. For example, after the completion of a read operation, iSER initiator 602 sends a logout request to iSER target 604.

At step 630 iSER target 604 releases the iSCSI control-type PDU receive buffers. In some embodiments, a logout may be the result of a connection error, in which case, iSER target 604 removes all the outstanding I/O requests and then releases the iSCSI control-type PDU receive buffers.

Figure 7:
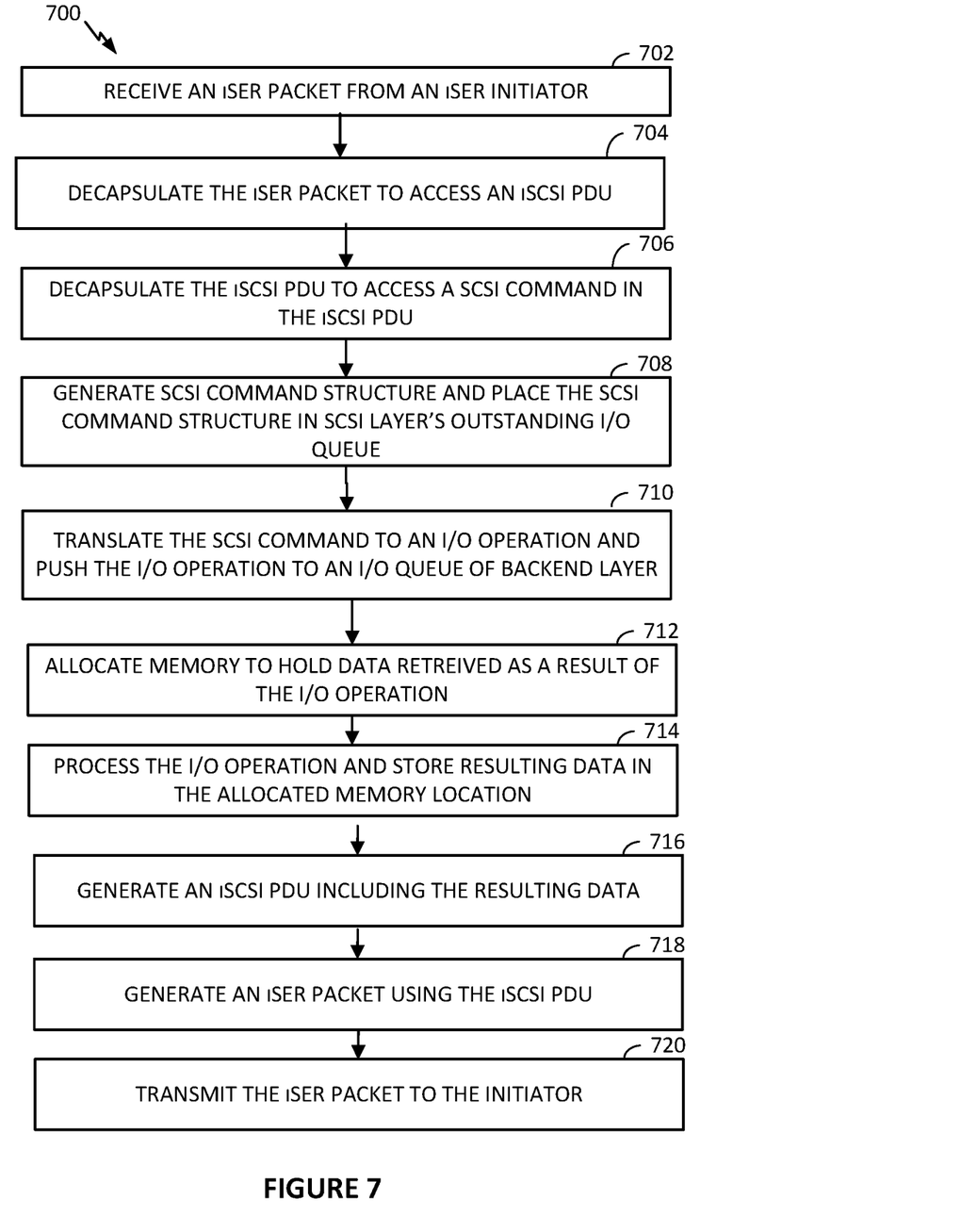
FIG. 7 illustrates example operations performed by a network-storage stack at an iSER target for processing an incoming I/O request in the form of an iSER packet, from an iSER initiator, according to certain embodiments.
Figure 8:
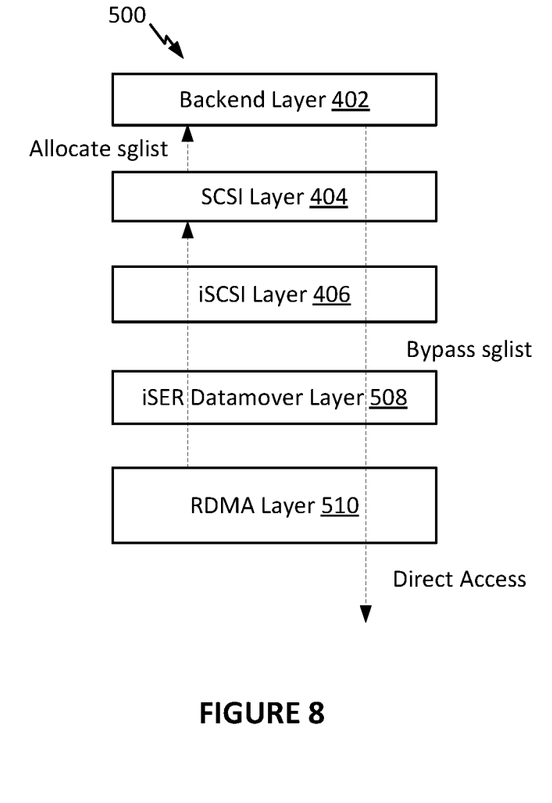
FIG. 8 illustrates an example network-storage protocol stack with an iSER, according to certain embodiments.

FIG. 7 illustrates operations 700 performed by network-storage stack 500 at an iSER target for processing an incoming I/O read request in the form of an iSER packet, from an iSER initiator. Network-storage stack 500 and the flow path of the incoming I/O request are shown in FIG. 8. Although network-storage stack 500 may, in certain embodiments, also comprise a TCP/IP datamover layer as well as a TCP/IP layer, in the example of FIG. 8, those layers are not shown. Operations 700 are described by reference to network-storage stack 500 of FIG. 8.

At block 702, the network-storage stack of the iSER target receives an iSER packet. For example, network-storage stack 500 receives an incoming iSER packet. An iSER packet, in some embodiments, may include an iSER header that encapsulates an iSCSI PDU. The iSER header may indicate an identifier (referred to as "STag") of a remote I/O buffer at the iSER initiator with an RNIC. The identifier informs the iSER target that the remote I/O buffer is available at the iSER initiator for RDMA read or RDMA write access by the iSER target. This remote I/O buffer is where the results of a SCSI read operation may be directly stored in. If the iSER packet includes a write command, the remote I/O buffer is where data associated with the iSCSI write operation may be retrieved from. For example, when an iSER initiator transmits a SCSI read command to an iSER target, the iSER target retrieves the requested data (i.e., results of the SCSI read operation) and transmits the requested data to the remote I/O buffer at the iSER initiator. More specifically, the iSER target writes the requested data to the remote I/O buffer using RDMA layer 510 through an RDMA write operation.

For a SCSI write operation, the remote I/O buffer identified by the iSER header contains the data that is to be written to the node cluster 110. For example, when an iSER initiator transmits a SCSI write command to an iSER target, the iSER target accesses the data stored in the remote I/O buffer and retrieves the data that is stored therein. More specifically, the iSER target reads the data stored in the remote I/O buffer using RDMA layer 510 through an RDMA read operation. In the example of operations 700, the iSER packet comprises a SCSI read command. In such an example, the iSER packet has an iSER header that identifies a remote I/O buffer where the results of the SCSI read operation will be stored at the iSER initiator.

At block 704, the network-storage stack of the iSER target decapsulates the iSER packet to access an iSCSI PDU. For example, when network-storage stack 500 receives the iSER packet, RDMA layer 510 processes the iSER packet and passes it to iSER datamover layer 508, which processes the iSER header of the iSER packet and decapsulates the iSER packet by removing the iSER header. Upon processing the iSER header, iSER datamover layer 508 identifies the remote I/O buffer as the location for storing the data that is going to be retrieved from node cluster 110 as a result of the SCSI read operation. Decapsulating the iSER packet results in an iSCSI PDU that comprises the SCSI read command. iSER datamover layer 508 passes the iSCSI PDU to iSCSI layer 406.

At block 706, the network-storage stack of the iSER target decapsulates the iSCSI PDU to access a SCSI command in the iSCSI PDU. For example, iSCSI layer 406 decapsulates the iSCSI PDU received from iSER datamover layer 508 to access a SCSI read command.

At block 708, the network-storage stack of the iSER target generates a SCSI command structure and places the SCSI command structure in the SCSI layer's outstanding I/O queue. For example, iSCSI layer 406 generates a SCSI command structure based on the SCSI read request and pushes the SCSI command structure to the SCSI layer 404's outstanding I/O queue.

At block 710, the network-storage stack of the iSER target translates the SCSI command to an I/O operation and pushes the I/O operation to an I/O queue of the backend layer. For example, SCSI layer 404 translates the SCSI read command to a read operation and pushes the read operation to an I/O queue of backend layer 402.

At block 712, the network-storage stack of the iSER target allocates memory at the iSER target's memory to hold data retrieved as a result of the I/O operation. For example, SCSI layer 404 allocates a scatter gather list (sglist) for holding the data. As discussed, scatter-gather is a type of memory addressing used to do direct memory access (DMA) data transfers of data that is written to noncontiguous areas of memory. A sglist is a list of vectors, each of which gives the location and length of one segment in the overall read or write request.

At block 714, the network-storage stack of the iSER target processes the I/O operation and stores the resulting data in the memory location allocated at step 712 (e.g., the sglist). Backend layer 402 has several threads that work to process I/O requests that are placed in the I/O queue of the backend layer 402. For example, a thread processes the read request pushed by SCSI layer 404 to the I/O queue of backed layer 402. Another thread may then pass the read request to the VSAN module (VSAN module 114) of the iSER target to retrieve data requested by the read request. As described above, VSAN module 114 comprises a DOM sub-module 340 that handles I/O operations. For example, DOM sub-module 340 handles a read request by accessing object store 116 and retrieving the data requested by the read request. SCSI layer 404 also passes the sglist to backend layer 402, which in turn passes the sglist to VSAN module 114 to store the retrieved data in the sglist. In certain embodiments, passing the sglist to backend layer 402 may include indicating the starting and ending memory addresses of the sglist. In certain embodiments, passing the sglist to backend layer 402 may also include assigning the ownership of the sglist to backend layer 402.

Once the read request is processed, VSAN module 114 stores the resulting data in the sglist. Backend layer 402 then passes the ownership of the sglist, which at this points stores the resulting data, to SCSI layer 404. SCSI layer 404 then accesses the data in the sglist and creates a SCSI DATA-IN PDU, comprising the data, by, for example, adding any necessary encapsulation data. The SCSI DATA-IN PDU is stored in the sglist. SCSI layer 404 then notifies iSCSI layer about the sglist's memory location.

At block 716, the network-storage stack of the iSER target generates an iSCSI PDU comprising the data. For example, iSCSI layer 406 accesses the SCSI DATA-IN PDU in the sglist and generates an iSCSI PDU comprising the SCSI DATA-IN PDU, which itself comprises the data resulting from the processing of the read request. The iSCSI layer 406 creates the iSCSI PDU by, for example, adding any necessary encapsulation information to the SCSI DATA-IN PDU that is stored in the sglist. The iSCSI PDU is stored in the sglist. iSCSI layer 406 then notifies iSER layer 406 of the memory location (e.g., starting and ending memory addresses) of sglist. Upon passing over the iSCSI PDU to iSER layer 406, iSER layer 406 becomes the owner of the iSCSI PDU or the data therein.

At block 718, the network-storage stack of the iSER target generates an iSER packet using the iSCSI PDU. For example, iSER layer 406 encapsulates the iSCSI PDU with an iSER header in the sglist by, for example, adding the iSER header to the iSCSI PDU. The iSER header comprises the identifier of the remote I/O buffer. Subsequently, iSER layer 406 notifies iSER datamover layer 508 of the memory location of the sglist. iSER datamover layer 508 then communicates with RMDA layer 510 to send out the iSER packet as a RDMA write operation.

At block 720, the network-storage stack of the iSER target transmits the iSER packet to the iSER initiator. For example, RDMA layer 510 transmits the iSER packet, including a RDMA write operation, to the RDMA layer of the iSER initiator. The network-storage stack of the iSER initiator receives the iSER packet, accesses the data within the iSER packet, and stores the data in the remote buffer.

Figure 9:
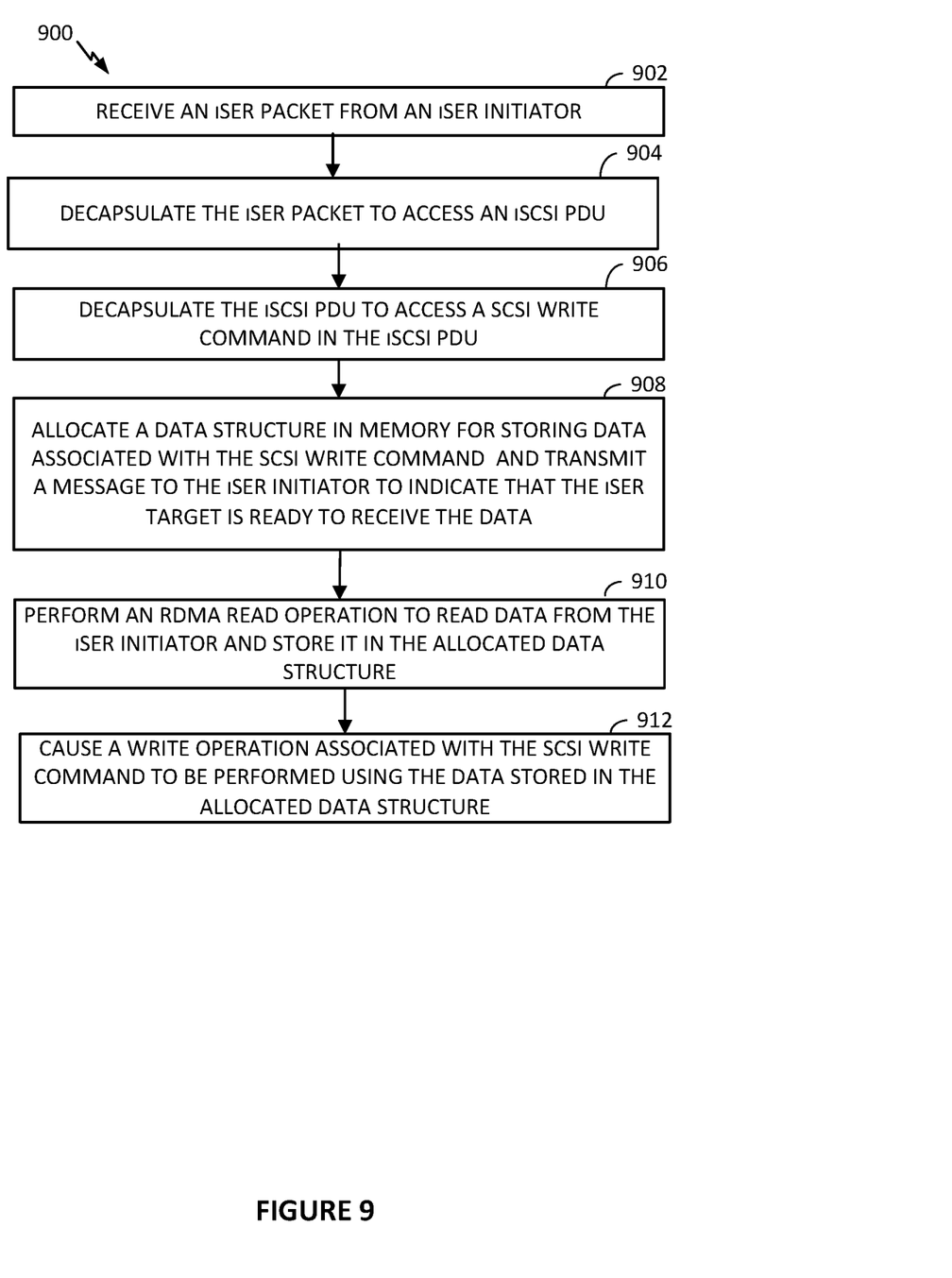
FIG. 9 illustrates operations performed by network-storage stack at an iSER target for processing an incoming I/O write request in the form of an iSER packet, from an iSER initiator.

FIG. 9 illustrates operations 900 performed by network-storage stack 500 at an iSER target for processing an incoming I/O write request in the form of an iSER packet, from an iSER initiator. At block 902, the network-storage stack of the iSER target receives an iSER packet. Block 902 is similar to block 702 of FIG. 7, with the exception that iSER packet in operations 900 comprises an SCSI write command. The iSER header of the iSER packet includes a remote key and a remote I/O buffer, which stores the data that the iSER initiator intends to write to node cluster 110.

At block 904, the network-storage stack of the iSER target decapsulates the iSER packet to access an iSCSI PDU. For example, when network-storage stack 500 receives the iSER packet, RDMA layer 510 processes the iSER packet and passes it to iSER datamover layer 508, which processes the iSER header of the iSER packet and decapsulates the iSER packet by removing the iSER header. Upon processing the iSER header, iSER datamover layer 508 identifies the remote I/O buffer offset associated with a remote I/O buffer, which includes data that the initiator intends to write to node cluster 110. iSER datamover layer 508 also stores the remote key and remote I/O buffer in memory. Decapsulating the iSER packet results in an iSCSI PDU that comprises the SCSI write command. iSER datamover layer 508 passes the iSCSI PDU to iSCSI layer 406.

At block 906, the network-storage stack of the iSER target decapsulates the iSCSI PDU to access a SCSI command in the iSCSI PDU. For example, iSCSI layer 406 decapsulates the iSCSI PDU received from iSER datamover layer 508 to access a SCSI write command.

At block 908, the network-storage stack of the iSER target allocates a data structure in memory for storing data associated with the SCSI write command and transmits an R2T PDU to the iSER initiator to indicate that the iSER target is ready to receive the data. For example, iSCSI layer 406 decapsulates the iSCSI PDU received from iSER datamover layer 508 to access a SCSI write command. When the SCSI write command reaches SCSI layer 404, SCSI layer 404 allocates a sglist in memory for storing the data. SCSI layer 404 then indicates to iSCSI layer 406 that the iSER target is now ready to receive the data. ISCSI layer 406 then transmits an R2T PDU to the iSER datamover layer 508, which iSER datamover layer 508 translates into an RDMA read operation. ISER datamover layer 508 then transmits the R2T PDU to the iSER initiator. ISER datamover layer 508 also feeds the remote key and remote I/O buffer offset to RDMA layer 510.

At block 910, the network-storage stack of the iSER target performs an RDMA read operation to read data from the iSER initiator and store it in the allocated memory. For example RDMA layer 510 performs an RDMA read operation to read data that is stored in the remote I/O buffer at the iSER initiator using the remote key and the remote I/O buffer offset. The data is then stored by RDMA layer 510 in the sglist. At this time, iSER datamover layer 508 notifies iSCSI layer 404 that the data is stored in the allocated memory and it is ready for a write operation requested by the SCSI write command (ready to be stored in node cluster 110).

At block 912, the network-storage stack of the iSER target causes a write operation associated with the SCSI write command to be performed using the data stored in the allocated data structure. For example, iSCSI 404 passes the ownership of sglist, including the data, to backend layer 402, which in turn passes the ownership of sglist to node cluster 110 (e.g., VSAN module 114 of the iSER target). VSAN module 114 of the iSER target then causes the write operation to be performed by node cluster 110. Causing the write operation to be performed by node cluster 110 comprises indicating to node cluster 110, through backend layer 402, that node cluster 110 has ownership of the sglist, which includes the data for the write operation. Node cluster 110 then performs the write operation by accessing the sglist and using the data. In operations 900, because a data structure that is recognized by node cluster 110 is allocated and used, no memory copies have to be performed, resulting in a more resource efficient and expeditious write operation.

Accordingly, the embodiments described herein provide a technical solution to a technical problem by using iSER in conjunction with RDMA, which allows for bypassing the TCP/IP protocol layers of a target or an initiator and permits data to be transferred directly, between an initiator and a target, using certain memory buffers, thereby avoiding the memory copies associated with the use of the TCP/IP protocol layers. Note that although some aspects of the disclosure are described with respect to a VM accessing a VSAN cluster, aspects can similarly be used for any virtual computing instance (VCI) or physical machine accessing any suitable distributed storage system (e.g., hyper-converged storage).

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method of processing an incoming packet by a target device associated with a distributed storage system, the method comprising:
   receiving the incoming packet from an initiator device, the incoming packet encapsulated by the initiator device using an Internet Small Computer Systems Interface (iSCSI) extension for remote direct memory access (RDMA) (iSER) of the initiator device;
   decapsulating the incoming packet to access a Small Computer Systems Interface (SCSI) read command indicating an input/output (I/O) operation to perform at the distributed storage system;
   allocating a scatter-gather list in a memory of the target device for storing data received from the distributed storage system as a result of performance of the I/O operation;
   storing the data in the scatter-gather list;
   encapsulating the data in the scatter-gather list to generate a SCSI DATA-IN PDU including the data, wherein the SCSI DATA-IN PDU is stored in the scatter-gather list;
   encapsulating the SCSI DATA-IN PDU to generate an outgoing iSCSI protocol data unit (PDU) including the SCSI DATA-IN PDU, wherein the outgoing iSCSI PDU is stored in the scatter-gather list;
   assigning ownership of the scatter-gather list storing the iSCSI PDU to an iSER of the target device;

encapsulating, by the iSER of the target device, the iSCSI PDU to generate an outgoing iSER packet; and transmitting the outgoing iSER packet to the initiator device.

2. The method of claim 1, wherein the decapsulating comprises removing an iSER header from the incoming packet.

3. The method of claim 1, wherein encapsulating the data in the scatter-gather list to generate a SCSI DATA-IN PDU is performed by a SCSI protocol layer of a network-storage stack of the target device, the method further comprising:

notifying, at the SCSI protocol layer, a iSCSI protocol layer of the network-storage stack about a memory location of the scatter-gather list, after encapsulating the data in the scatter-gather list to generate the SCSI DATA-IN PDU.

4. The method of claim 1, wherein encapsulating the data in the scatter-gather list to generate a iSCSI PDU is performed by a iSCSI protocol layer of a network-storage stack of the target device.

5. A target apparatus, comprising:

a non-transitory memory comprising executable instructions; and a processor in data communication with the non-transitory memory and configured to execute the executable instructions to cause the target apparatus to perform operations comprising:

receiving an incoming packet from an initiator apparatus, the incoming packet encapsulated by the initiator apparatus using an Internet Small Computer Systems Interface (iSCSI) extension for remote direct memory access (RDMA) (iSER) of the initiator apparatus;

decapsulating the incoming packet to access a Small Computer Systems Interface (SCSI) read command indicating an input/output (I/O) operation to perform at a distributed storage system;

allocating a scatter-gather list in a memory of the target apparatus for storing data received from the distributed storage system as a result of performance of the I/O operation;

storing the data in the scatter-gather list;

encapsulating the data in the scatter-gather list to generate a SCSI DATA-IN PDU including the data, wherein the SCSI DATA-IN PDU is stored in the scatter-gather list;

encapsulating the SCSI DATA-IN PDU to generate an outgoing iSCSI protocol data unit (PDU) including the SCSI DATA-IN PDU, wherein the outgoing iSCSI PDU is stored in the scatter-gather list;

assigning ownership of the scatter-gather list storing the iSCSI PDU to an iSER of the target apparatus;

encapsulating the iSCSI PDU to generate an outgoing iSER packet; and transmitting the outgoing iSER packet to the initiator apparatus.

6. The target apparatus of claim 5, wherein the decapsulating comprises removing an iSER header from the incoming packet.

7. The target apparatus of claim 5, wherein encapsulating the data in the scatter-gather list to generate a SCSI DATA-IN PDU is performed by a SCSI protocol layer of a network-storage stack of the target apparatus, wherein the operations further comprise:

notifying, at the SCSI protocol layer, a iSCSI protocol layer of the network-storage stack about a memory location of the scatter-gather list, after encapsulating the data in the scatter-gather list to generate the SCSI DATA-IN PDU.

8. The target apparatus of claim 5, wherein encapsulating the data in the scatter-gather list to generate a iSCSI PDU is performed by a iSCSI protocol layer of a network-storage stack of the target apparatus.

9. A non-transitory computer readable medium having instructions stored thereon that, when executed by a target device, cause the target device to perform operations comprising:

receiving an incoming packet from an initiator device, the incoming packet encapsulated by the initiator device using an Internet Small Computer Systems Interface (iSC SI) extension for remote direct memory access (RDMA) (iSER) of the initiator device;

decapsulating the incoming packet to access a Small Computer Systems Interface (SCSI) read command indicating an input/output (I/O) operation to perform at a distributed storage system;

allocating a scatter-gather list in a memory of the target device for storing data received from the distributed storage system as a result of performance of the I/O operation;

storing the data in the scatter-gather list;

encapsulating the data in the scatter-gather list to generate a SCSI DATA-IN PDU including the data, wherein the SCSI DATA-IN PDU is stored in the scatter-gather list;

encapsulating the SCSI DATA-IN PDU to generate an outgoing iSCSI protocol data unit (PDU) including the SCSI DATA-IN PDU, wherein the outgoing iSCSI PDU is stored in the scatter-gather list;

assigning ownership of the scatter-gather list storing the iSCSI PDU to an iSER of the target device;

encapsulating the iSCSI PDU to generate an outgoing iSER packet; and transmitting the outgoing iSER packet to the initiator device.

10. The non-transitory computer readable medium of claim 9, wherein the decapsulating comprises removing an iSER header from the incoming packet.

11. The non-transitory computer readable medium of claim 9, wherein encapsulating the data in the scatter-gather list to generate a SCSI DATA-IN PDU is performed by a SCSI protocol layer of a network-storage stack of the target device, wherein the operations further comprise:

notifying, at the SCSI protocol layer, a iSCSI protocol layer of the network-storage stack about a memory location of the scatter-gather list, after encapsulating the data in the scatter-gather list to generate the SCSI DATA-IN PDU.

12. The non-transitory computer readable medium of claim 9, wherein encapsulating the data in the scatter-gather list to generate a iSCSI PDU is performed by a iSCSI protocol layer of a network-storage stack of the target device.

13. A method of processing an incoming packet by a target device associated with a distributed storage system, the method comprising:

receiving the incoming packet from an initiator device, the incoming packet encapsulated by the initiator device using an Internet Small Computer Systems Interface (iSCSI) extension for remote direct memory access (RDMA) (iSER) of the initiator device;

identifying a remote I/O buffer offset in an iSER header of the incoming packet, the remote I/O buffer offset being associated with a remote I/O buffer at the initiator device, the remote I/O buffer including data associated with a SCSI write command in the incoming packet;

storing the remote I/O buffer in a memory of the target device;

decapsulating, at an iSER of the target device, the incoming packet to access an Internet Small Computer Systems Interface (iSCSI) packet data unit (PDU);

decapsulating the iSCSI PDU to access the SCSI write command;

allocating a scatter-gather list in the memory for storing the data associated with the SCSI write command;

performing an RDMA operation to read the data from the remote I/O buffer of the initiator device;

storing the data into the scatter-gather list; and causing a write operation associated with the SCSI write command to be performed by the distributed storage system, wherein the distributed storage system accesses the scatter-gather list to perform the write operation using the data in the scatter-gather list.

* * * * *